United States Patent Office 3,311,643
Patented Mar. 28, 1967

3,311,643
NOVEL EPOXIDES, METHODS OF MAKING SAME, AND POLYMERS THEREOF
Samuel W. Tinsley, Jr., South Charleston, and Erich Marcus, Charleston, W. Va., assignors to Union Carbide Corporation, a corporation of New York
No Drawing. Filed Dec. 29, 1961, Ser. No. 163,090
14 Claims. (Cl. 260—348)

This invention relates to novel epoxides, novel polymers derived therefrom, and novel unsaturated di- and tri-esters. The invention also relates to curable compositions containing the novel epoxides, with or without other reactive organic compounds and/or a catalyst, in addition to polymers thereof in various degrees of polymerization.

The epoxides of this invention are readily polymerizable in the presence of a suitable catalyst and/or active organic hardener and particularly are useful for coating, laminating, bonding, molding, casting, potting, and the like. They are capable of accepting solid materials, such as fillers and pigments, for providing various effects in physical properties and coloration. The curable compositions also can be easily spread, brushed, or sprayed by many techniques available in the paint, lacquer, and varnish industries for making coatings and finishes. Negligible shrinkage, if any, occurs in curing to the resin. The curable compositions are capable of being accurately shaped by molds having intricate molding surfaces and fully cured to resins carrying exact details of such molding surfaces. They can also be advantageously employed in the potting of such fragile articles as electronic components.

The curable compositions described above can also be partially reacted at elevated temperatures to form viscous thermosetting liquids or thermosetting solids. The resulting fusible thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

In those instances where the novel epoxides contain olefinic unsaturation in addition to the vicinal-epoxy groups, vinyl polymerization can be carried out in the presence of a vinyl polymerization catalyst if desired, with or without other olefinically unsaturated organic compounds which are capable of vinyl polymerization. The resulting polymer contains pendant vicinal-epoxy groups which are reactive under the influence of acidic or basic catalysts or with active organic hardeners. Also, the novel olefinically unsaturated epoxides can be polymerized through their vicinal-epoxy groups as will appear hereinafter to provide a polymer having pendant polymerizable olefinically unsaturated groups.

The novel di- and tri-esters of this invention are particularly useful as precursors for certain of the novel epoxides described herein and, in addition, are valuable as vinyl polymerizable materials in the manufacture of coatings, laminates, adhesives, etc. Certain of the unsaturated di- and tri-esters have a pronounced toxic effect on mite eggs and are eminently useful as mite ovicides or as the active toxic ingredient in mite ovicide compositions.

The noxel epoxides of this invention are 2,3-epoxycyclopentylacetic acid and the organic esters and amides thereof. The novel epoxides are represented by the formula (I) 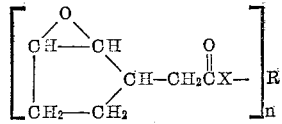

wherein R is a radical having a valence of $n$ and is chosen from the class consisting of hydrogen, alkyl preferably having up to 18 carbon atoms, alkenyl preferably having up to 18 carbon atoms, vicinal-epoxyalkyl wherein the vicinal-epoxy group is at least one carbon atom removed from the closest ether oxygen or amidic nitrogen and preferably having 3 to 18 carbon atoms, vicinal-epoxycycloalkyl group preferably having 5 to 7 carbon atoms in the ring wherein the vicinal-epoxy group is contained in the ring and is at least one carbon atom removed from the closest ether oxygen or amidic nitrogen, 3-oxatricyclo[3.2.1.0$^{2,4}$]oct-6-yl, 3-oxatricyclo[3.2.1.0$^{2,4}$]oct-6-ylalkyl preferably having 1 to 7 carbon atoms in the alkyl moiety thereof, 4-oxatetracyclo[6.2.1.0$^{2,7}$.0$^{3,5}$]undec-9-yl, 4-oxatetracyclo[6.2.1.0$^{2,7}$.0$^{3,5}$]undec-9-ylalkyl preferably having 1 to 7 carbon atoms in the alkyl moiety thereof, divalent alkane radical (alkylene group) preferably having 2 to 18 carbon atoms, divalent oxaalkane radical (oxa-alkylene group) preferably having 2 to 4 carbon atoms between the ether oxygens thereof, and trivalent alkane radical preferably having 2 to 18 carbon atoms; $n$ is an integer from 1 to 3 equalling the valence of R; X is

or —O—; and R' is a monovalent R radical. By the term "vicinal-epoxy" as used herein is meant the

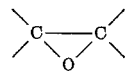

group. In addition, the term "oxa-alkane" or "oxa-alkylene" as used herein designates two or more alkylene groups connected by one or more oxygen atoms in ether linkage, e.g., a monoether group represented by (-alkylene-O-alkylene-), a diether group represented by (-alkylene-O-alkylene-O-alkylene-), and the like.

Typical groups represented by R include
methyl,
ethyl,
stearyl,
iso-octyl,
2,3-epoxybutyl,
2-methyl-2,3-epoxypropyl,
2-methyl-2,3-epoxybutyl,
2,3-epoxypentyl,
2,3-epoxyhexyl,
2,3-epoxyoctyl,
4,5-epoxyhexyl,
4,5-epoxypentyl,
5,6-epoxyoctyl,
10,11-epoxyundecyl,
9,10-epoxydecyl,
9,10-epoxyoctadecyl,
2,3-epoxycyclopentyl,
4-methyl-2,3-epoxycyclopentyl,
4-isopropyl-2,3-epoxycyclopentyl,
3,4-epoxycyclohexyl,
3-ethyl-3,4-epoxycyclohexyl,
4-methyl-2,3-epoxycyclohexyl,
6-n-butyl-3,4-epoxycyclohexyl, 5-amyl-3,4-epoxycyclohexyl,
2,4-diethyl-3,4-epoxycyclohexyl,
3,4-epoxycycloheptyl,
4,5-epoxycycloheptyl,
2-ethyl-3,4-epoxycycloheptyl,
2,3-epoxycyclopentylmethyl,
4-methyl-2,3-epoxycyclopentylethyl,
3,4-epoxycyclohexylmethyl,
2-n-propyl-3,4-epoxycyclohexylmethyl,
5-ethyl-3,4-epoxycyclohexylpropyl,
3,4-epoxycyclohexylamyl,
3,4-epoxycycloheptylmethyl,
3,4-epoxycycloheptylethyl,
3-oxatricyclo[3.2.1.0$^{2,4}$]oct-6-yl,
lower alkyl substituted-3-oxatricyclo[3.2.1.0$^{2,4}$]oct-6-yl,
4-oxatetracyclo[6.2.1.0$^{2,7}$.0$^{3,5}$]undec-9-yl,
lower alkyl substituted-4-oxatetracyclo[6.2.1.0$^{2,7}$.0$^{3,5}$]undec-9-yl,
vinyl,
allyl,
butenyl,
3-oxapentylene,
—(CH$_2$)$_2$O(CH$_2$)$_2$—,
3,6-dioxaoctylene,
—(CH$_2$)$_2$O(CH$_2$)$_2$O(CH$_2$)$_2$—,
3,6,9-trioxaundecylene,
—(CH$_2$)$_2$O(CH$_2$)$_2$O(CH$_2$)$_2$O(CH$_2$)$_2$—,
4-oxaheptylene,
—(CH$_2$)$_3$O(CH$_2$)$_3$—,
4,8-dioxaundecylene,
—(CH$_2$)$_3$O(CH$_2$)$_3$O(CH$_2$)$_3$—,
4,8,12-trioxapentadecylene,
—(CH$_2$)$_3$O(CH$_2$)$_3$O(CH$_2$)$_3$O(CH$_2$)$_3$—,
2-methyl-3-oxapentylene,
2,5-dimethyl-3,6-dioxaoctylene,
2,5,8-trimethyl-3,6,9-trioxaundecylene, and residues of the following triols having not more than one hydroxyl group attached to a single carbon atom, which residues are derived by the elimination of alcoholic hydroxyl groups: glycerol, trimethylolmethane, 1,1,1-trimethylolethane, 1,1,1-trimethylolpropane, 1,2,6-hexanetriol, 1-allyloxy-2,4,6-trimethylolbenzene, 1-phenyl-1,2,3-propanetriol, 1,4-benzopyran-3,5,7-triol, and the like.

The novel esters of this invention therefore include
alkyl,
2,3-epoxycyclopentylacetate,
alkenyl 2,3-epoxycyclopentylacetate,
epoxyalkyl 2,3-epoxycyclopentylacetate,
epoxycycloalkyl 2,3-epoxycyclopentylacetate,
alkanediol bis(2,3-epoxycyclopentylacetate),
alkanetriol tris(2,3-epoxycyclopentylacetate),
oxa-alkanediol bis(2,3-epoxycyclopentylacetate),
3-oxatricyclo[3.2.1.0$^{2,4}$]oct-6-yl 2,3-epoxycyclopentylacetates,
3-oxatricyclo[3.2.1.0$^{2,4}$]oct-6-ylalkyl 2,3-epoxycyclopentylacetates,
4-oxatetracyclo[6.2.1.0$^{2,7}$.0$^{3,5}$]undec-9-yl 2,3-epoxycyclopentylacetates, and
4-oxatetracyclo[6.2.1.0$^{2,7}$.0$^{3,5}$]undec-9-ylalkyl 2,3-epoxycyclopentylacetates.

The novel amides of this invention include
N-alkyl-2,3-epoxycyclopentylacetamides,
N,N'-dialkyl-2,3-epoxycyclopentylacetamides,
N-alkenyl-2,3-epoxycyclopentylacetamides,
N,N'-dialkenyl-2,3-epoxycyclopentylacetamides,
N-epoxyalkyl-2,3-epoxycyclopentylacetamides,
N,N'-(diepoxyalkyl)-2,3-epoxycyclopentylacetamides,
N-epoxycycloalkyl-2,3-epoxycyclopentylacetamides,
N,N'-di(epoxycycloalkyl)-2,3-epoxycyclopentylacetamides,
N-(3-oxatricyclo[3.2.1.0$^{2,4}$]oct-6-yl)-2,3-epoxycyclopentylacetamides,
N,N'-di(3-oxatricyclo[3.2.1.0$^{2,4}$]oct-6-yl)-2,3-epoxycyclopentylacetamides,
N-(3-oxatricyclo[3.2.1.0$^{2,4}$]oct-6-ylalkyl)-2,3-epoxycyclopentylacetamides,
N,N'-di(3-oxatricyclo[3.2.1.0$^{2,4}$]oct-6-ylalkyl)-2,3-epoxycyclopentylacetamides,
N-(4-oxatetracyclo[6.2.1.0$^{2,7}$.0$^{3,5}$]undec-9-yl)-2,3-epoxycyclopentylacetamides,
N,N'-di(4-oxatetracyclo[6.2.1.0$^{2,7}$.0$^{3,5}$]undec-9-yl)-2,3-epoxycyclopentylacetamides,
N-(4-oxatetracyclo[6.2.1.0$^{2,7}$.0$^{3,5}$]undec-9-ylalkyl)2,3-epoxycyclopentylacetamides,
N,N'-di(4-oxatetracyclo[6.2.1.0$^{2,7}$.0$^{3,5}$]undec-9-ylalkyl)-2,3-epoxycyclopentylacetamides, and
alkanediamine bis(2,3-epoxycyclopentylacetamides).

Illustrative examples of the novel epoxides of this invention include vinyl 2,3-epoxycyclopentylacetate,
glycidyl 2,3-epoxycyclopentylacetate,
2-methyl-2,3-epoxypropyl-2,3-epoxycyclopentylacetate,
2,3-epoxycyclopentyl 2,3-epoxycyclopentylacetate,
4-oxatetracyclo[6.2.1.0$^{2,7}$.0$^{3,5}$]undec-9 (and 10)-yl 2,3-epoxycyclopentylacetate,
ethylene glycol bis(2,3-epoxycyclopentylacetate),
2,2-dimethylpropanediol bis(2,3-epoxycyclopentylacetate),
1,2,3-propanetriol tris(2,3-epoxycyclopentylacetate),
1,2,6-hexanetriol tris(2,3-epoxycyclopentylacetate),
2,3-epoxycyclopentylacetic acid,
2,3-epoxycyclopentylacetamide,
stearyl 2,3-epoxycyclopentylacetate,
N-methyl-2,3-epoxycyclopentylacetamide,
N-allyl-2,3-epoxycyclopentylacetamide,
N-glycidyl-2,3-epoxycyclopentylacetamide,
N-(2,3-epoxycyclopentyl)-2,3-epoxycyclopentylacetamide,
ethylenediamine bis(2,3-epoxycyclopentylacetamide),
and the like.

The novel epoxides of this invention are prepared by the epoxidation of olefinically and unsaturated precursors having the following formula (I) 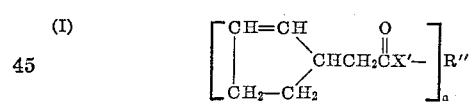

wherein R″ is a radical having a valence of $n$ and is chosen from the class consisting of hydrogen, alkyl, preferably having up to 18 carbon atoms, alkenyl preferably having up to 18 carbon atoms, cycloalkenyl preferably having 5 to 7 carbon atoms in the ring thereof and wherein the olefinic unsaturation thereof is at least one carbon atom removed from the closest ether oxygen or amidic nitrogen, tricyclo[5.2.1.0$^{2,6}$]dec-3-en-8(and 9)-yl, tricyclo[5.2.1.0$^{2,6}$]dec-53-en-8(and 9)-ylalkyl, bicyclo[2.2.1]hept-5-en-2-yl, bicyclo[2.2.1.]hept-5-en-2 - ylalkyl, divalent alkane, divalent oxa-alkane, and trivalent alkane; $n$ is an integer from 1 to 3 and X′ is —O— or

wherein R‴ is a monovalent R″ radical. Illustrative examples of olefinically unsaturated precursors are vinyl cyclopent-2-enylacetate,
allyl cyclopent-2-enylacetate,
methallyl cyclopent-2-enylacetate,
2-cyclopentenyl cyclopent-2-enylacetate,
tricyclo[5.2.1.0$^{2,6}$]dec-3-en-8(and 9)-yl cyclopent-2-enylacetate,
tricyclo[5.2.1.0$^{2,6}$]dec-3-en-8(and 9)-ylalkyl cyclopent-2-enylacetate, bicyclo[2.2.1]hept-5-en-2-yl cyclopent-2-enylacetate,
bicyclo[2.2.1]hept-5-en-2-ylalkyl cyclopent-2-
  enylacetate,
ethylene glycol bis(cyclopent-2-enylacetate),
2,2-dimethylpropanediol bis(cyclopent-2-enylacetate),
1,2,3-propanetriol tris(cyclopent-2-enylacetate),
1,2,6-hexanetriol tris(cyclopent-2-enylacetate),
cyclopent-2-enylacetic acid,
cyclopent-2-enylacetamide,
stearyl cyclopent-2-enylacetate,
N-methylcyclopent-2-enylacetamide,
N-allylcyclopent-2-enylacetamide,
N-(cyclopent-2-enyl)cyclopent-2-enylacetamide,
ethylene diamine bis(cyclopent-2-enylacetamide,
and the like.

The epoxidation of the above-mentioned olefinically unsaturated precursors is preferably carried out with an organic peracid, such as peracetic acid, perpropionic acid, perbenzoic acid, and the like, in the presence of an inert organic solvent or vehicle, such as ethyl acetate, butyl acetate, acetone, and the like. A solution comprising from about 10 to 50 weight percent of the peracid in the inert organic solvent is suitable and a 20 to 40 weight percent solution of the peracid in the inert organic solvent is preferred. The epoxidation is conducted at a temperature of 0° C., or lower, to about 100° C., or higher, but preferably is conducted at a temperature of about 20° C. to 80° C. Theoretically, one mole of the peracid is required to epoxidize one carbon to carbon olefinic double bond of the unsaturated precursor. When it is desired to obtain a novel epoxide having in addition olefinically unsaturated groups the amount of peracid employed is less than that required to epoxidize all of the carbon to carbon olefinic double bonds of a precursor having more than one olefinic double bond per molecule. For example, when it is desired to produce a novel epoxide having one epoxy group and one olefinic double bond, one-half mole of peracid is employed for each olefinic double bond of an unsaturated precursor having two olefinic double bonds. In this manner two olefinically unsaturated compounds are formed and are separated by suitable distillation techniques from each other and any diepoxide also formed.

Inasmuch as some degradation of the peracid occurs during the epoxidation, it is preferable to use an amount of the peracid which is greater than the amount needed to produce the desired degree of epoxidation, for example, about 25 percent greater. Periodic analyses of the reaction mixture are performed to determine the extent of epoxidation by measuring the quantity of peracid consumed. When the epoxidation has reached the desired extent, known separation and purification techniques, e.g., distillation under reduced pressure, are employed to recover the novel epoxides of this invention.

The olefinically unsaturated precursors are readily obtained by any one of five methods which include (1) the esterification of cyclopent-2-enylacetic acid and an alcohol, (2) the esterification of cyclopent-2-enylacetyl chloride with alcohols, (3) the addition reaction of the hydroxyl hydrogen of cyclopent-2-enylacetic acid and an olefinically unsaturated compound, (4) transesterification of cylopent-2-enylacetic acid and vinyl esters, and (5) metathesis reactions of sodium cyclopent-2-enylacetate with alkenyl halides. Cyclopent-2-enylacetic acid is advantageously prepared by the reaction of 3-chlorocyclopentene and ketene to form cyclopent-2-enylacetyl chloride which then can be reacted with water to produce cyclopent-2-enylacetic acid. Cyclopent-2-enylacetamide is then prepared by reacting cyclopent-2-enylacetic acid with ammonia. The N-substituted cyclopent-2-enylacetamides are obtained by reacting cyclopent-2-enylacetyl chloride with the corresponding organic amine.

The novel unsaturated di- and tri-esters of this invention are represented by Formula II, wherein X' is as previously defined, R" is a divalent alkane radical (alkylene group) having 2 to 18 carbon atoms, a divalent oxa-alkane radical (oxa-alkylene group) having 2 to 4 carbon atoms between the ether oxygens thereof and a trivalent alkane radical having from 3 to 18 carbon atoms, and $n$ is an integer from 2 to 3 equalling the valence of R". Wherever employed herein, the radical R" when multivalent has no more than one valence attached to a single carbon atom thereof. These novel di- and tri-esters are prepared in the manner described above for the preparation of olefinically unsaturated precursors represented by Formula II.

The novel epoxides of this invention which contain olefinic unsaturation can be self-polymerized through the olefinic unsaturation thereof or copolymerized through said olefinic unsaturation with other polymerizable olefinically unsaturated organic monomers to produce novel polymers having pendant vicinal-epoxy groups. These polymers are obtained by heating to temperatures in the range of 40–100° C. in the presence of vinyl polymerization catalysts, such as benzoyl peroxide, t-butyl hydroperoxide, cumene hydroperoxide, acetyl peroxide, p-menthane hydroperoxide, lauroyl peroxide, di-t-butyl peroxide, t-butyl perbenzoate, and the like. Illustrative polymerizable olefinically unsaturated monomers include the heptenes, nonenes, ethylene, propylene, isobutylene, hexadiene, cyclopentene, cyclohexene, styrene, divinylbenzene, divinyl ether, diallyl ether, methyl methacrylate, methyl acrylate, ethyl acrylate, maleic anhydride, maleic anhydride polyesters, acrylic acid, vinyl chloride, vinyl acetate, and the like. Such polymers comprise chains of carbon atoms having pendant vicinal-epoxy groups which are further reactive under the influence of acidic or basic catalysts or with active organic hardeners.

In addition, the novel epoxides of this invention which contain olefinic unsaturation can be self-polymerized through their vicinal-epoxy groups or copolymerized through their vicinal-epoxy groups with other vicinal-epoxy organic compounds or with active organic hardeners, as will be more fully described hereinafter, to form novel polymers having pendant olefinically unsaturated groups. The polymerizations or copolymerizations through the vicinal-epoxy groups are best conducted at temperatures between 25° C. to about 250° C., preferably in the presence of a suitable acidic or basic catalyst if no active organic hardener is employed.

In general, the novel epoxides of this invention are self-polymerizable through their vicinal-epoxy groups or copolymerizable through vicinal-epoxy groups with other vicinal-epoxy organic compounds, such as ethylene oxide, propylene oxide, dicyclopentadiene dioxide, divinylbenzene dioxide, vinylcyclohexene dioxide, butylene oxide, cyclohexene oxide and the like. These polymerizations or copolymerizations are advantageously conducted in the presence of acidic and basic catalysts including the metal halide Lewis acids, e.g., boron trifluoride, stannic chloride, complexes of metal halide Lewis acids with organic amines and ethers, e.g., boron trifluoride-piperidine complex, strong mineral acids, e.g., sulfuric acid, phosphoric acid, and the like, organic sulfonic acids, alkali metal hydroxides, organic amines, e.g., triethylamine, and the like. When the catalyst and the novel epoxides are immiscible, the catalyst can be added as a solution in an inert organic solvent. In general, catalyst concentrations from about 0.005 to about 15 weight percent, preferably about 0.01 to about 5 weight percent based on the weight of the novel epoxide, are advantageous.

In addition, the novel epoxides of this invention are generally polymerizable, with or without other vicinal-epoxy organic compounds, through their vicinal-epoxy groups with active organic hardeners, such as polycarboxylic acids, polycarboxy polyesters, polycarboxylic acid anhydrides, polyols, e.g., polyhydric phenols, polyhydric alcohols, and polyhydric polyesters, polyfunctional amines, polythiols, polyisocyanates, polyacyl halides, and the like, by mixing said epoxides with said hardener and maintaining the resulting mixture at a temperature from about 25° C. to 250° C.

Representative active organic hardeners for admixture and/or reaction with the novel unsaturated epoxides include oxalic acid, succinic acid, glutaric acid, adipic acid, suberic acid, alkylsuccinic acids, alkenylsuccinic acids, maleic acid, itaconic acid, allylmalonic acid, 3-hexynedioic acid, 1,2-cyclohexanedicarboxylic acid, phthalic acid, terephthalic acid, phthalic anhydride, tetrahydrophthalic anhydride, maleic anhydride, glutaric anhydride, succinic anhydride, nonenylsuccinic anhydride, 1,8-naphthalic anhydride, lower alkyl substituted-bicyclo[2.2.1]hept-5-ene-2,3-dicarboxylic anhydride, methylbicyclo[2.2.1]hept-2-ene-2,3-dicarboxylic anhydride, ethylene glycol, diethylene glycol, the polyethylene glycols, propylene glycol, the polypropylene glycols, 1,1,1-trimethylolpropane, the polyvinyl alcohols, the cyclopentanediols, the cyclohexanediols, resorcinol, catechol, bis(4-hydroxyphenyl)-2,2-propane, 1,8-naphthalenediol, polycarboxy polyesters prepared by known condensation procedures, employing mole ratios favoring greater than equivalent amounts of polycarboxylic acid or polycarboxylic acid anhydride, such as those listed above, with relation to the polyhydric alcohol, such as those listed above, and polyhydroxy polyesters prepared by known procedures, employing mole ratios favoring greater than equivalent amounts of polyhydric alcohol with relation to the polycarboxylic acid or anhydride. Copolymers are formed from the novel epoxides and organic hardeners by mixing the two with or without other vicinal-epoxy compounds and with or without acidic or basic catalysts as set forth above, and heating. The relative amounts of novel epoxide organic hardener and, if employed, other vicinal-epoxy compound, preferably is such that it will provide 0.1 to about 2.0 active groups, e.g., amine groups (of the polyfunctional amine), carboxylic groups (of the polycarboxylic acid and/or anhydride and/or polycarboxy polyester and/or polyacyl halide), hydroxyl groups (of the polyhydric alcohol and/or phenol and/or polyhydric polyester), and the like, per vicinal-epoxy group contained by the novel epoxide and any other vicinal-epoxy compound contained in the mixture.

The novel unsaturated di- and tri-esters of this invention are polymerizable through their olefinic unsaturation, with or without other polymerizable olefinically unsaturated organic monomers as described above, in the presence of vinyl polymerization catalysts as described above to produce novel and useful polymers. In addition, they are useful as mite ovicides. Representative novel unsaturated diesters include ethylene glycol bis(2-cyclopentenylacetate), 2,2-dimethylpropanediol bis(2-cyclopentenylacetate), diethylene glycol bis(2-cyclopentenylacetate), 1,6-hexanediol bis(2-cyclopentenylacetate), triethylene glycol bis(2-cyclopentenylacetate), and the like. Representative novel unsaturated triesters include 1,2,3-propanetriol tris(2-cyclopentenylacetate), 1,2,6-hexanetriol tris(2-cyclopentenylacetate), 1,1,1-trimethylolpropane tris(2-cyclopentenylacetate), and the like.

The following examples are presented. In the examples all parts and percentages are by weight and $M_D$ designates the molar refraction based on the D-line of sodium.

EXAMPLE 1

*Vinyl 2,3-epoxycyclopentylacetate*

To 142 g. of vinyl 2-cyclopentenylacetate which was maintained with stirring at 15–20° C., there were added dropwise over a period of ninety minutes 324 g. of a 23 percent solution of peracetic acid in ethyl acetate. After four hours at 24–27° C., the temperature was raised to 40° C. for one hour and then stored overnight at 0° C. At the end of this time, only about 77 percent of the theoretical amount of peracetic acid had been consumed. Therefore, an additional 165 g. of the peracetic acid solution was added to the reaction mixture and heating at 40° C. was continued for eight hours. The volatiles were removed by co-distillation with ethylbenzene and the residue was distilled through a short column to give 29 g. of heads cut and 46 g. of vinyl 2,3-epoxycyclopentylacetate, B.P. 69°/0.15 mm.–105°/0.6 mm., $n30/D$ 1.4620–1.4646. The remainder of the distillation charge polymerized in the kettle. The product had an indicated purity of 96 percent by epoxide analysis (pyridine hydrochloride method) and its infrared spectrum was consistent with the assigned structure. Elemental analysis gave the following results:

Calcd. for $C_9H_{12}O_3$: C, 64.27; H, 7.19. Found: C, 64.23; H, 7.29.

EXAMPLE 2

*Glycidyl 2,3-epoxycyclopentylacetate*

To 190 g. of allyl 2-cyclopentenylacetate which was maintained with stirring at 50° C., there were added dropwise over 155 minutes 944 g. of a 24 percent solution of peracetic acid in ethyl acetate. After an additional three hours at 50° C. and six hours at 60–70° C., over 95 percent of the theoretical amount of peracetic acid had been consumed. The volatiles were removed by co-distillation with 1000 g. of ethylbenzene and the residue, 226 g., was distilled through an 8″ x 82 mm. glass helices-packed column to give 32 g. of heads cut (containing mainly allyl 2,3-epoxycyclopentylacetate) and 115 g. of glycidyl 2,3-epoxycyclopentylacetate. The product had the following properties: B.P. 113°/0.25 mm.–110°/0.12 mm., $n30/D$ 1.4704–1.4722 and an indicated purity 91.4 percent by epoxide analysis (pyridine hydrochloride method). Elemental analysis gave the following results:

Calcd. for $C_{10}H_{14}O_4$: C, 60.59; H, 7.12. Found: C, 60.82; H, 7.32.

EXAMPLE 3

*2-methyl-2,3-epoxypropyl 2,3-epoxycyclopentylacetate*

Methallyl 2-cyclopentenylacetate was prepared in standard fashion from methallyl alcohol and cyclopenteneacetyl chloride in the presence of 2-methyl-5-ethylpyridine. It had the following physical properties: B.P. 67–72°/0.55 mm., $n30/D$ 1.4617.

To 68 g. of methallyl 2-cyclopentenylacetate which was maintained with stirring at 25°–30° C., there were added dropwise over a period of three hours 294 g. of a 24.4 percent solution of peracetic acid in ethyl acetate. After an additional three hours at 30° C. and two hours at 50° C., the reaction was essentially complete as indicated by a titration for peracetic acid. The volatiles were removed by co-distillation with ethylbenzene and the residue was distilled through a short packed column to give 40 g. of 2-methyl-2,3-epoxypropyl 2,3-epoxycyclopentylacetate, B.P. 106°–108°/0.25 mm., $n30/D$ 1.4640–1.4653, purity 82 percent as indicated by epoxide analysis (pyridine hydrochloride method). Elemental analysis gave the following results:

Calcd. for $C_{11}H_{16}O_4$: C, 62.25; H, 7.60. Found: C, 61.49; H, 7.52.

EXAMPLE 4

*2,3-epoxycyclopentyl 2,3-epoxycyclopentylacetate*

2-cyclopentenyl chloride (155 g., 1.5 moles) was added at room temperature with stirring during a period of one hour and ten minutes to a slurry of sodium 2-cyclopentenylacetate (1.5 moles prepared from 2-cyclopentenylacetic acid and sodium hydroxide) in toluene (400 ml.). After stirring for another four hours at room temperature the reaction mixture was washed with water and then with a sodium hydroxide solution to remove the cyclopentenylacetic acid which had been formed as a by-product during the reaction. The organic layer was washed twice more with water, dried over calcium chloride, filtered, and distilled through a 10″ column to give 91 g. (32 percent yield) of product, B.P. 80–84°/0.9 mm., $n20/D$ 1.4851, $d20/4$ 1.018. Elemental analysis gave the following results:

Calcd. for $C_{12}H_{16}O_2$: C, 74.97; H, 8.39; $M_D$, 53.95. Found: C, 75.15; H, 8.42; $M_D$, 54.1.

To 91 g. of 2-cyclopentenyl 2-cyclopentenylacetate which was maintained with stirring at 40° C., there were added dropwise over a period of ninety minutes 399 g. of a 24.4 percent solution of peracetic acid in ethyl acetate. After an additional reaction time of five hours at 40° C. and four hours at 50° C., the theoretical amount of peracetic acid had been consumed. The volatiles were removed by co-distillation with 500 g. of ethylbenzene and the residue, 108 g., was finally freed of solvent by heating at 50° C. for three hours at a pressure of less than 1 mm. on a rotary evaporator. The residue product, thus obtained, had an indicated purity of 82 percent by epoxide analysis; therefore, 96 g. was distilled through a short packed column to give 12 g. of heads cut and 64 g. of 2,3-epoxycyclopentyl 2,3-epoxycyclopentylacetate, B.P. 119°–129°/0.3 mm., $n30/D$ 1.4834–1.4840, purity 89 percent by epoxide analysis (pyridine hydrochloride method). Elemental analysis gave the following results:

Calcd. for $C_{12}H_{16}O_4$: C, 64.27; H, 7.19. Found: C, 63.39; H, 7.08.

EXAMPLE 5

*4-oxatetracyclo[6.2.1.0$^{2,7}$.0$^{3,5}$]undec-9(and 10)-yl 2,3-epoxycyclopentylacetate*

Dicyclopentadiene (198 g., 1.5 moles) was added with stirring during a period of two hours to a mixture of 2-cyclopentenylacetic acid (189 g., 1.5 moles) and boron trifluoride-ether complex (5 g.), while the temperature was maintained between 45 and 64°. The mixture was stirred for an additional hour at about 60°. The reaction mixture was washed with water and then with a sodium hydroxide solution to remove the unchanged 2-cyclopentenylacetic acid. The organic layer was diluted with chloroform, washed twice more with water, dried over calcium chloride, filtered, and distilled on a gooseneck to give 218 g. (56 percent yield) of the desired ester, tricyclo[5.2.1.0$^{2,6}$]dec-3-en-8(and 9)-yl 2-cyclopentenyl acetate, B.P. 130°/0.9 mm.–175°/0.5 mm. Redistillation through a 10″ column afforded 208 g. of pure product, B.P. 126°/0.4 mm.–128°/0.45 mm., $n20/D$ 1.5131, $d$ 20/4 1.069. Elemental analysis gave the following results:

Calcd. for $C_{17}H_{22}O_2$: C, 79.03; H, 8.58; $M_D$, 72.65. Found: C, 79.06; H, 8.36; $M_D$, 72.7.

To 189 g. of tricyclo[5.2.1.0$^{2,6}$]dec-3-en-8(and 9)-yl 2-cyclopentenylacetate which was maintained with stirring at 35°–40° C., there were added dropwise over a period of 140 minutes 544 g. of a 24.6 percent solution of peracetic acid in ethyl acetate. After two additional hours at 35° C., the reaction was essentially complete as indicated by a titration for peracetic acid. The volatiles were removed by codistillation with 100 g. of ethylbenzene and the residue was distilled through a 8″ x 32 mm. glass helices-packed column. There was obtained, after a 24 g. heads cut, 180 g. of the desired product, B.P. 179°/0.25 mm.–188°/0.35 mm., $n30/D$ 1.5094–1.5100. Elemental analysis showed:

Calcd. for $C_{17}H_{22}O_4$: C, 70.32; H, 7.64. Found: C, 69.87; H, 7.74.

EXAMPLE 6

*Ethylene glycol bis(2,3-epoxycyclopentylacetate)*

A mixture of 2-cyclopentenylacetic acid (302 g., 2.4 moles), ethylene glycol (62 g., 1.0 mole), concentrated sulfuric acid (2 ml.), and toluene (140 ml.) was refluxed with stirring for two and one-half hours. The water of the reaction was removed azeotropically during this time (33 ml. of lower layer in the distillate). After addition of sodium acetate (10 g.) and benzene (150 ml.), the reaction mixture was stirred for five minutes, filtered, and distilled on a gooseneck to give 200 g. (79 percent yield) of the crude product, ethylene glycol bis(2-cyclopentenylacetate), B.P. 130°/0.25 mm.–155°/0.2 mm. Redistillation through a short column gave 189 g. of pure product, B.P. 134°/0.2 mm.–134°/0.1 mm., $n20/D$ 1.4830, $d20/4$ 1.074. Elemental analysis showed:

Calcd. for $C_{16}H_{22}O_4$: C, 69.04; H, 7.97; $M_D$, 74.08. Found: C, 69.02; H, 8.16; $M_D$, 74.0.

To 167 g. of ethylene glycol bis(2-cyclopentenylacetate) which was maintained with stirring at 25–30° C., there were added dropwise over a two hour period 475 g. of a 24 percent solution of peracetic acid in ethyl acetate. After an additional two hours at 27° C., the theoretical amount of peracetic acid had been consumed. The volatiles were removed by co-distillation with ethylbenzene and the residue was distilled through an 8″ x 32 mm. glass helices-packed column to give 11 g. of heads cut and 165 g. of ethylene glycol bis(2,3-epoxycyclopentylacetate), B.P. 170–184°/0.06 mm., $n30/D$ 1.4818, indicated purity 99 percent by epoxide determination (pyridine hydrochloride method). Elemental analysis showed:

Calcd. for $C_{16}H_{22}O_6$: C, 61.92; H, 7.15. Found: C, 62.05; H, 7.38.

EXAMPLE 7

*2,2-dimethylpropanediol bis(2,3-epoxycyclopentylacetate)*

The precursor, 2,2-dimethylpropanediol bis(2-cyclopentenylacetate), was prepared from 2,2-dimethyl-1,3-propanediol and 2-cyclopentenylacetic acid. It had the following physical properties: B.P. 148–150°/0.2 mm., $n$ 30/D 1.4790, $d20/4$ 1.033.

To 170 g. of 2,2-dimethylpropanediol bis(2-cyclopentenylacetate) which was maintained with stirring at 30° C., there were added dropwise over a period of 135 minutes 416 g. of a 24.3 percent solution of peracetic acid in ethyl acetate. After an additional four hours at 30° C., over 98 percent of the theoretical amount of peracetic acid had been consumed in the reaction. The volatiles were removed by co-distillation with 1000 g. of ethylbenzene and the residue was finally freed of ethylbenzene by heating at 80° C. for twenty minutes at a pressure of 0.3 mm. The residue product, 2,2-dimethylpropanediol bis(2,3-epoxycyclopentylacetate), had an indicated purity of 93.5 percent by epoxide analysis (pyridine hydrochloride method). Elemental analysis showed:

Calcd. for $C_{19}H_{28}O_6$: C, 64.75; H, 8.01. Found: C, 65.00; H, 8.06.

EXAMPLE 8

*1,2,3-propanetriol tris (2,3-epoxycyclopentylacetate)*

A mixture of cyclopentylacetic acid (487 g., 3.85 moles), glycerine (108 g., 1.17 moles), concentrated sulfuric acid (1.75 ml.), and toluene (200 ml.) was refluxed for four hours. The water of the reaction was removed azeotropically during this time (63 ml. of lower layer in the distillate). The mixture was washed with water, 10 percent sodium hydroxide solution, and again with water, dried over calcium chloride, filtered, and distilled without rectification to give 376 g. (77 percent yield) of 1,2,3-propanetriol tris(2-cyclopentenylacetate), B.P. 200°/0.2 mm.–225°/0.5 mm. The product (365 g.) boiling at 200–210°/0.2 mm. was analyzed, $n20/D$ 1.420, $d20/4$ 1.101. Elemental analysis showed:

Calcd. for $C_{24}H_{32}O_6$: C, 69.21; H, 7.74; $M_D$, 110.02. Found: C, 69.16; H, 7.77; $M_D$, 109.8.

To 360 g. of 1,2,3-propanetriol tris(2-cyclopentenylacetate) which was maintained with stirring at 25–30° C., there were added dropwise 1043 g. of a 22.7 percent solution of peracetic acid in ethyl acetate. After an additional 1.5 hours at 25–30° C., 96.8 percent of the theoretical amount of peracetic acid had been consumed. The volatiles were removed by co-distillation with 1400 g. of ethylbenzene, and the residue was heated to a final temperature of 90° C. at a pressure of 0.7 mm. Hg. The residue material (401 g.) analyzed 92.5 percent as 1,2,3-propanetriol tris(2,3-epoxycyclopentylacetate by the pyridine hydrochloride method. Elemental analysis showed:

Calcd. for $C_{24}M_{32}O_9$: C, 62.05; H, 6.94. Found: C, 61.99; H, 7.03.

EXAMPLE 9

*1,2,6-hexanetriol tris (2,3-epoxycyclopentylacetate)*

This product was prepared in a similar fashion from 1,2,6-hexanetriol and 2-cyclopentenylacetic acid. The desired product, boiling between 222 and 232° at 0.2 mm., was analyzed, $n20/D$ 1.4910, $d20/4$ 1.073. Elemental analysis showed:

Calcd. for $C_{27}H_{38}O_6$: C, 70.71; H, 8.35; $M_D$, 122.38. Found: C, 70.66; H. 8.48; $M_D$, 123.4.

A 227 percent solution of peracetic acid in ethyl acetate was added dropwise to one mole of 1,2,6-hexanetriol tris(2-cyclopentenylacetate) in the manner described in Example 8 to provide 1,2,6-hexanetriol tris(2,3-epoxycyclopentylacetate).

EXAMPLE 10

*2,3-epoxycyclopentylacetic acid*

To 200 g. of 2-cyclopentenylacetic acid which was maintained with stirring at 10–15° C., there were added dropwise over a 135 minute period 555 g. of a 24 percent solution of peracetic acid in ethyl acetate. After an additional two and one-half hours at 16°–21° C., 95 percent of the theoretical amount of peracetic acid had been consumed. The reaction mixture was added dropwise to 200 g. of ethylbenzene which was refluxing at 25–30 mm. and the ehtyl acetate, acetic acid and excess peracetic acid were continuously removed overhead. The kettle was finally freed of ethylbenzene by heating at 50° C. for twenty minutes at a pressure of 5 mm. The residue product, 2,3-epoxycyclopentylacetic acid, thus obtained, crystallized on storage at 0° C. Elemental analysis showed:

Calcd. for $C_7H_{10}O_3$: C, 59.14; H, 7.09. Found: C, 59.07; H, 7.07.

EXAMPLE 11

*2,3-epoxycyclopentylacetamide*

To a solution of 74 g. of 2-cyclopentenylacetamide in 500 g. of dioxane which was maintained with stirring at 25–30° C., there were added dropwise over a period of one hour 183 g. of a 30.8 percent solution of peracetic acid in ethyl acetate. The mixture was stirred for an additional two hours at about 25° C. The volatiles were removed by co-distillation with 700 g. of ethylbenzene. The residue was cooled to −10° C. to give 64 g. of a solid, M.P. 98–99°, which was collected by filtration. A second crop of 10 g. was obtained. The two crops were combined and recrystallized from ethyl acetate to give .37 g. of the desired product, 2,3-epoxycyclopentylacetamide, M.P. 115–116° C. The infrared spectrum was consistent with the postulated structure. Elemental analysis showed:

Calcd. for $C_7H_{11}NO_2$: C, 59.55; H, 7.85. Found: C, 59.23; H, 8.06.

EXAMPLE 12

One mole of stearyl alcohol is reacted with one mole of cyclopent-2-enylacetic acid to produce stearyl cyclopent-2-enylacetate which is then dissolved in ethyl acetate and epoxidized with peracetic acid as described in Example 1 to produce stearyl 2,3-epoxycyclopentylacetate.

EXAMPLE 13

One mole of cyclopent-2-enylacetyl chloride is reacted with one mole of methylamine to form N-methylcyclopent-2-enylacetamide which in turn is dissolved in dioxane and epoxidized with peracetic acid in the manner described in Example 11 to produce N-methyl-2,3-epoxycyclopentylacetamide.

EXAMPLES 14 AND 15

One mole of allylamine is reacted with one mole of cyclopent-2-enylacetyl chloride to form N-allylcyclopent-2-enylacetamide which is dissolved in dioxane and epoxidized with peracetic acid in the manner described in Example 11 to produce a mixture which is fractionally distilled under reduced pressure to provide separate fractions of N-allyl-2,3-epoxycyclopentylacetamide and N-glycidyl-2,3-epoxycyclopentylacetamide.

EXAMPLE 16

One mole of cyclopent-2-enylamine and one mole of cyclopent-2-enylacetyl chloride are reacted to form N-(cyclopent-2-enyl)cyclopent-2-enylacetamide which is dissolved in dioxane and epoxidized with peracetic acid in the manner disclosed in Example 11 to form N-(2,3-epoxycyclopentyl)-2,3-epoxycyclopentylacetamide.

EXAMPLE 17

One mole of ethylenediamine and two moles of cyclopent-2-enylacetyl chloride are reacted to form ethylenediamine bis(cyclopent-2-enylacetamide) which is dissolved in dioxane and epoxidized with peracetic acid to produce ethylenediamine bis(2,3-epoxycyclopentylacetamide).

NOVEL RESINS

In the following five examples, the epoxide and hardener were charged to test tubes, mixed and heated as indicated. The resulting resinous products ranged from viscous liquids to hard, tough resins. The pertinent data are contained in the attached tables.

EXAMPLE 18

*2,2-dimethylpropanediol bis(2,3-epoxycyclopentylacetate)*

[Amount of novel epoxide: 1.9 parts]

| Run No. | Hardener | Parts | Ratio [a] | Cure, Hrs. at ° C. | Resin Description |
|---|---|---|---|---|---|
| 1 | Diethylenetriamine | 0.22 | 1.0 | 1.5 at 120; 6 at 160; 4 at 200 | Hard. |
| 2 | p,p'-Methylenedianiline | 0.5 | 1.0 | 1.5 at 120; 6 at 160; 4 at 200 | Highly viscous. |
| 3 | Phthalic anhydride | 0.9 | 1.25 | 1.5 at 120; 6 at 160; 4 at 200 | Hard. |
| 4 | {1,2,6-hexanetriol<br>{$BF_3$-MEA [b] | 0.2<br>0.05 | 0.5 | 1.5 at 120; 6 at 160; 4 at 200 | Highly viscous. |
| 5 | {Bisphenol A<br>{KOH, 15% in ethylene glycol | 0.64<br>0.03 | 0.5 | 1.5 at 120; 6 at 160; 4 at 200 | Do |

[a] Ratio of reactive groups of hardener per one epoxy group.
[b] Boron trifluoride-monoethylamine.

EXAMPLE 19

*4-oxatetracyclo[6.2.1$^{1,8}$.0$^{2,7}$.0$^{3,5}$]undec-9(and 10)-yl 2,3-epoxycyclopentylacetate*

[Amount of novel epoxide: 1.5 parts]

| Run No. | Hardener | Parts | Ratio a | Cure, Hrs. at °C. | Resin Description |
|---|---|---|---|---|---|
| 1 | Diethylenetriamine | 0.22 | 1.0 | 7 at 120; 6 at 160 | Soft, flexible. |
| 2 | p,p'-Methylenedianiline | 0.5 | 1.0 | 7 at 120; 6 at 160 | Do. |
| 3 | Adipic acid | 0.44 | 0.6 | 7 at 120; 6 at 160 | Do. |
| 4 | Phthalic anhydride | 0.74 | 1.0 | 7 at 120; 6 at 160 | Hard, brittle, Barcol.b 36. |
| 5 | BF$_3$-monoethylamine | 0.15 | | 5 at 120; 6 at 160 | Hard, brittle Barcol, 40. |
| 6 | KOH, 15% in ethylene glycol | 0.056 | | 7 at 120; 6 at 160 | Highly viscous. | a Ratio of reactive groups of hardener per one opoxide group.
b Barcol Impressor 934-1.

EXAMPLE 20

*Glycidyl 2,3-epoxycyclopentylacetate*

[Amount of novel epoxide: 1.0 part or 0.01 equivalent]

| Run No. | Hardener | Parts | Ratio a | Cure Hrs. at 120 | Cure Hrs. at 160 | Cure Hrs. at 200 | Resin Description |
|---|---|---|---|---|---|---|---|
| 1 | Methylenedianiline | 0.5 | 1.0 | 5 | 7 | | Hard. |
| 2 | Diethylenetriamine | 0.22 | 1.0 | 5 | 7 | | Tough. |
| 3 | Phthalic anhydride | 0.93 | 1.25 | 5 | 7 | | Tough, Barcol,b 48. |
| 4 | Maleic anhydride | 0.49 | 1.0 | 5 | 7 | | Tough, Barcol, 45. |
| 5 | Adipic acid | 0.55 | 0.75 | 5 | 7 | 2 | Viscous. |
| 6 | {Hexanetriol / BF$_3$·MEA} | 0.22 / 0.05 | 0.5 | 5 | 7 | | Do. |
| 7 | {Bisphenol A / 15% KOH in ethylene glycol} | 0.96 / 0.06 | 0.75 | 5 | 7 | 2 | Soft. |
| 8 | BF$_3$-monoethylamine | 0.05 | | 5 | 7 | | Do. | a Ratio of reactive groups of hardener per one epoxy group.
b Barcol Impressor 934-1.

EXAMPLE 21

*2-methyl-2,3-epoxypropyl 2,3-epoxycyclopentylacetate*

[Amount of novel epoxide: 1.1 parts or 0.01 equivalent]

| Run No. | Hardener | Parts | Ratio a | Cure Hrs. at °C. | Cure Hrs. at °C. | Resin Description |
|---|---|---|---|---|---|---|
| 1 | Diethylene triamine | 0.2 | 1.0 | 1/120 | 6/160 | Soft. |
| 2 | Methylenedianiline | 0.5 | 1.0 | 1/120 | 6/160 | Soft. |
| 3 | {Phthalic anhydride / Ethylene glycol} | 0.74 / 0.06 | 1.0 / 0.2 | 1/120 / 1/120 | 6/160 / 6/160 | }Hard. |
| 4 | {Maleic anhydride / Ethylene glycol} | 0.5 / 0.06 | 1.0 / 0.2 | 1/120 / 1/120 | 6/160 / 6/160 | }Soft. |
| 5 | BF$_3$·MEA (borontrifluoride-monoethylamine) | 0.05 | | 1/120 | 6/160 | Viscous. |
| 6 | {Bisphenol A / Potassium hydroxide, 15% in ethylene glycol} | 0.65 / 0.015 | 0.5 | 1/120 | 6/160 | Highly viscous. |
| 7 | {Hexanetriol / BF$_3$-monoethylamine} | 0.2 / 0.05 | 0.5 | 1/120 | 6/160 | Viscous. | a Ratio of reactive groups of hardener per one epoxy group.

EXAMPLE 22

*Ethylene glycol bis(2,3-epoxycyclopentylacetate)*

[Amount of novel epoxide: 1.6 parts or 0.01 equivalent]

| Run No. | Hardener | Parts | Ratio (a) | Cure Hrs. at °C. | Cure Hrs. at °C. | Resin Description |
|---|---|---|---|---|---|---|
| 1 | Methylenedianiline | 0.5 | 1.0 | 5/120 | 6/160 | Viscous. |
| 2 | Diethylene triamine | 0.22 | 1.0 | 5/120 | 6/160 | Tough. |
| 3 | Phthalic anhydride | 0.93 | 1.25 | 5/120 | 6/160 | Hard. |
| 4 | Maleic anhydride | 0.5 | 1.0 | 5/120 | 6/160 | Tough. |
| 5 | Adipic acid | 0.55 | 0.75 | 5/120 | 6/160 | Viscous. |
| 6 | {Hexanetriol / BF$_3$-MEA b} | 0.22 / 0.16 | 0.5 | 2/160 | 20/200 | Do. |
| 7 | {Bisphenol A / 15%KOH in ethylene glycol} | 0.96 / 0.06 (0.05) | 0.75 / 0.6% (0.15) | 5/120 | 6/160 | Highly viscous. |
| 8 | BF$_3$-MEA b | 0.08 | 5% | 3/120 | 7/160 | Tough. | a Ratio of reactive groups of hardener per one epoxy group.
b (Borontrifluoride-monoethylamine.)

EXAMPLE 23

Ethylene glycol bis(cyclopent-2-enylacetate) was dissolved in acetone and emulsifier added and diluted with water. A black blotting card containing eggs of the two-spotted mite [*Tetranychus telarius* (L.)] obtained from adult mites reared on Tendergreen beans under controlled conditions (about 80° F. and about 50 percent relative humidity) was dipped into the solution prepared above and held at about 80° F. and 50 percent relative humidity for five days. Microscopic examination was made of the card and the number of unhatched eggs (considered dead) and hatched eggshells (living eggs) were recorded. In this manner by varying the concentration of the solution, an LD 50 in parts per million of 180 was found. A standard reference "Ovex" had an LD 50 in parts per million of 230 in the same test.

EXAMPLE 24

One mole of vinyl 2,3-epoxycyclopentylacetate and one mole of ethylene were mixed and heated in the presence of benzoyl peroxide to provide a polymer having a carbon to carbon chain with pendant 2,3-epoxycyclopentyl-acetyloxy groups.

The novel epoxides of this invention thus include 2,3-epoxycyclopentylacetic acid, aliphatic esters of 2,3-epoxycyclopentylacetic acid composed of carbon, hydrogen, and oxygen as epoxy oxygen, ether oxygen, and carbonyl oxygen, and the aliphatic amides of 2,3-epoxycyclopentylacetic acid containing carbon, hydrogen, oxygen as epoxy oxygen and carbonyl oxygen, and nitrogen as amidic nitrogen.

EXAMPLE 25

One mole of diethylamine is reacted with one mole of cyclopent-2-enylacetyl chloride to form N,N'-diethyl-cyclopent-2-enylacetamide which, in turn, is dissolved in dioxane and epoxidized with peracetic acid in the manner described in Example 11 to produce N,N'-diethyl-2,3-epoxycyclopentylacetamide.

EXAMPLE 26

A mixture of vinyl acetate (1590 g., 18.5 moles) and mercuric acetate (12 g.) was stirred for one hour at room temperature to effect solution. A solution of concentrated sulfuric acid (6 g.) in acetic acid (30 ml.) was added dropwise over a fifty-minute period with stirring. After the rapid addition of 2-cyclopentene-acetic acid (390 g., 3.1 moles), the mixture was stirred for ninety-two hours at room temperature. Hydroquinone (0.4 g.) was added as an inhibitor, and sodium acetate (10 g.) was added to neutralize the catalyst. A small amount of a solid was removed by filtration; the filtrate was distilled without rectification to recover the excess of vinyl acetate and 448 g. of a higher boiling material, B.P. 50°/10 mm.–110°/2 mm. According to titration this distillate contained 0.85 mole of acidic material. After addition of petroleum ether the product was washed with sufficient sodium hydroxide solution, twice with water, dried over calcium chloride, filtered, and distilled through a 36" long column to give 333 g. of vinyl 2-cyclopentenylacetate (71 percent yield), B.P. 37°/1.75 mm.–38°/0.95 mm. The largest fraction (262 g.) distilled between 40°/1.15 mm. and 38°/0.85 mm., $n^{20}/D$ 1.4618, $d^{20}$ 0.986. Elemental analysis gave the following results:

Calcd. for $C_9H_{12}O_2$: C, 71.02; H, 7.95; $M_D$, 42.29. Found: C, 70.96; H, 7.95; $M_D$, 42.4.

The infrared and mass spectra were consistent with the proposed structure.

Reasonable variations and modifications of this invention can be made or carried out in the light of the above disclosure without departing from the spirit and scope thereof.

We claim:
1. A compound of the formula:

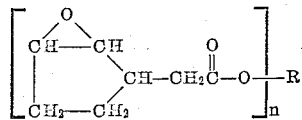

wherein $n$ is an integer of 2 to 3 and wherein R is a saturated alkane radical of 2 to 18 carbon atoms having a valence of $n$.

2. A compound of the formula:

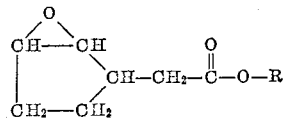

wherein R is a vicinal epoxyalkyl group of from 3 to 18 carbon atoms with the proviso that the said epoxy group is at least one carbon atom removed from the oxygen atom.

3. A compound of the formula:

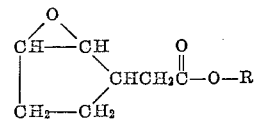

wherein R is a vicinal epoxycycloalkyl group of from 5 to 7 carbon atoms in the ring, and wherein the epoxy group is contained in the ring and wherein the vicinal epoxy group is at least one carbon atom removed from the oxygen atom.

4. A compound of the formula:

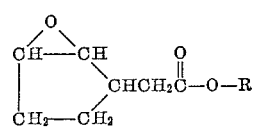

wherein R is an alkenyl group of from 2 to 18 carbon atoms.

5. A compound of the formula:

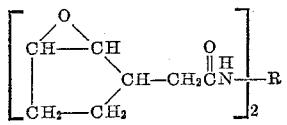

wherein R is a saturated divalent alkane radical of from 2 to 18 carbon atoms.

6. Vinyl 2,3-epoxycyclopentylacetate.
7. Glycidyl 2,3-epoxycyclopentylacetate.
8. 2-methyl-2,3-epoxypropyl 2,3-epoxycyclopentylacetate.
9. Allyl 2,3-epoxycyclopentylacetate.
10. 2,3-epoxycyclopentyl 2,3-epoxycyclopentylacetate.
11. Ethylene glycol bis(2,3-epoxycyclopentylacetate).
12. 2,2-dimethyl-1,3-propanediol bis(2,3-epoxycyclopentylacetate).
13. 1,2,3-propanetriol tris(2,3-epoxycyclopentylacetate).
14. 1,2,6-hexanetriol tris(2,3-epoxycyclopentylacetate).

(References on following page)

References Cited by the Examiner

UNITED STATES PATENTS

| | | | |
|---|---|---|---|
| 2,395,452 | 2/1946 | Bruson | 260—497 |
| 2,677,705 | 5/1954 | Utzinger | 260—557 |
| 2,679,509 | 5/1954 | Hasselstrom | 260—468 |
| 2,687,406 | 8/1954 | Foster | 260—88.3 |
| 2,739,161 | 3/1956 | Carlson | 260—348 |
| 2,848,426 | 8/1958 | Newey | 260—348 |
| 2,850,509 | 9/1958 | Nichols et al. | 260—348 |
| 2,870,170 | 1/1959 | Payne et al. | 260—348 |
| 3,041,291 | 6/1962 | Bailey et al. | 260—2 |
| 3,043,813 | 7/1962 | Kilsheimer et al. | 260—348 |

OTHER REFERENCES

Bartlett et al.: Jour. Am. Chem. Soc., vol. 68, January 1946, pp. 6–8.

Stoll et al.: Helvetica Chimica Acta, vol. 33, No. 196 (1950), p. 1511.

WALTER A. MODANCE, *Primary Examiner.*

IRVING MARCUS, NICHOLAS S. RIZZO,
                                  *Examiners.*

J. P. FRIEDENSON, NORMA S. MILESTONE,
                              *Assistant Examiners.*